United States Patent
Ruehe et al.

(10) Patent No.: US 7,571,917 B2
(45) Date of Patent: Aug. 11, 2009

(54) LINK FOR A VEHICLE WHEEL SUSPENSION SYSTEM WITH A PREDETERMINED BREAKING POINT

(75) Inventors: Ulrich Ruehe, Munich (DE); Stefan Reich, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/956,540

(22) Filed: Dec. 14, 2007

(65) Prior Publication Data

US 2008/0088105 A1   Apr. 17, 2008

Related U.S. Application Data

(63) Continuation of application No. PCT/EP2006/006843, filed on Jul. 13, 2006.

(30) Foreign Application Priority Data

Jul. 20, 2005  (DE) ................. 10 2005 033 810

(51) Int. Cl.
*B60G 7/00* (2006.01)
(52) U.S. Cl. ............ 280/124.1; 280/124.128; 280/124.134; 180/274
(58) Field of Classification Search ........... 280/124.1, 280/124.128, 124.134; 180/274
See application file for complete search history.

(56) References Cited

U.S. PATENT DOCUMENTS

| | | | | |
|---|---|---|---|---|
| 4,334,693 A * | 6/1982 | Huber | ............. | 280/124.143 |
| 5,183,286 A * | 2/1993 | Ayabe | ............. | 280/124.1 |
| 5,556,119 A | 9/1996 | Buchner et al. | | |
| 5,601,304 A * | 2/1997 | Tilly et al. | ............. | 280/124.15 |
| 5,607,177 A | 3/1997 | Kato | | |
| 5,845,938 A * | 12/1998 | Kato | ............. | 280/784 |
| 6,007,058 A | 12/1999 | Kokubo et al. | | |
| 6,298,962 B1 | 10/2001 | Kato et al. | | |
| 6,994,374 B2 * | 2/2006 | Miyasaka | ............. | 280/784 |
| 2002/0180171 A1 | 12/2002 | Hasebe et al. | | |

FOREIGN PATENT DOCUMENTS

| | | |
|---|---|---|
| DE | 38 00 944 C1 | 1/1989 |
| DE | 41 42 587 A1 | 7/1992 |

(Continued)

OTHER PUBLICATIONS

International Search Report dated Sep. 19, 2006 with English translation of relevant portion (Six (6) pages).

(Continued)

*Primary Examiner*—Paul N. Dickson
*Assistant Examiner*—George D. Spisich
(74) *Attorney, Agent, or Firm*—Crowell & Moring LLP

(57) ABSTRACT

A suspension arm for a vehicle wheel suspension having an intended breakpoint is described. The suspension arm is provided on a first end with a stub axle for receiving a vehicle wheel, and on at least one second end with the hole for receiving a fastener for fastening a bearing to connect the suspension arm to a subframe of a vehicle body. The suspension arm has an intended breakpoint designed to fail because of strain overload due to deformation during an accident, and the intended breakpoint is designed in such a way that the fastener breaks out of the hole.

20 Claims, 2 Drawing Sheets

FOREIGN PATENT DOCUMENTS

| | | |
|---|---|---|
| DE | 195 42 496 C1 | 10/1996 |
| DE | 101 46 314 A1 | 4/2003 |
| DE | 698 21 974 T2 | 12/2004 |
| EP | 0 993 382 B1 | 4/2000 |
| EP | 1 312 535 A2 | 5/2003 |
| FR | 2 652 312 A1 | 3/1991 |
| WO | WO 99/28636 A1 | 6/1999 |

OTHER PUBLICATIONS

German Search Report dated Jan. 31, 2006 with English translation of relevant portion (Nine (9) pages).

* cited by examiner

LINK FOR A VEHICLE WHEEL SUSPENSION SYSTEM WITH A PREDETERMINED BREAKING POINT

CROSS REFERENCE TO RELATED APPLICATIONS

This application is a continuation of PCT International Application No. PCT/EP2006/006843, filed Jul. 13, 2006, which claims priority under 35 U.S.C. § 119 to German Patent Application No. 10 2005 033 810.0 filed Jul. 20, 2005, the entire disclosure of which is herein expressly incorporated by reference.

BACKGROUND AND SUMMARY OF THE INVENTION

The present invention relates to a suspension arm for a vehicle wheel suspension having on one end a stub axle for receiving a wheel, and on another end a fastener for a bearing connecting to a vehicle subframe.

Providing vehicle wheel suspensions with intended breakpoints is described. For example, in European Patent Document EP 993 382 B1, which describes a four-point suspension arm of a rigid axle suspension for utility vehicles, which is connected as a torsionable cross via two joints on each side, having a distance to one another in the vehicle transverse direction, on one side to the vehicle axle and on the other side to the vehicle body. One of the four arms of the four-point suspension arm has an intended breakpoint, which is designed in such a way that in the event of axial strain well above the maximum demands to be expected and thus destruction of the four-point suspension arm possibly connected thereto, this destruction first occurs in the area of the intended breakpoint and thus controllably. It is thus intended that the vehicle may still drive to the closest service station without external support, because one of the two four-point suspension arms is still fastened to the vehicle axle.

The axial strain originates from the strain, i.e., overloading of the vehicle, in this case. For other axial strains, for example, in case of an accident, this intended breakpoint is not expedient. In addition, sharp open fracture surfaces, which may damage other components in the event of an accident, arise in the event of fracture of the suspension arm in this way.

The object of the present invention is to provide a suspension arm for a vehicle wheel suspension which deforms as little as possible even in the event of a severe accident and may thus favorably slide off of other vehicle components upon touching them. Therefore, as few sharp-edged, externally active fracture surfaces as possible are also to arise.

According to the present invention, a suspension arm for a vehicle wheel suspension, which is essentially provided on a first end with a stub axle for receiving a vehicle wheel and is essentially provided on at least one second end with a hole for receiving a fastener to fasten a bearing to connect the suspension arm to a subframe or vehicle body, the suspension arm having an intended breakpoint to fail because of strain overload due to deformation of the vehicle during an accident, is characterized in that the intended breakpoint is designed in such a way that the fastener breaks out of the hole.

It is advantageously ensured by such an intended breakpoint in the suspension arm that it deforms as little as possible even in the event of a severe accident and may thus favorably slide off of other vehicle components upon touching them. The suspension arm essentially maintains its form, so that no sharp-edged, externally active fracture surfaces arise.

In preferred embodiments of the present invention, the suspension arm is produced by a casting method, in particular from cast light alloy. If the fastener is a bolt or a screw, it may easily break at least partially out of the hole essentially in the radial direction, if its wall is previously weakened in at least one radial direction outward from the hole center point, in particular by at least one material recess.

In a further preferred embodiment of the present invention, the hole is a pocket threaded hole and the fastener is a screw which is screwed into the pocket threaded hole. The suspension arm having such a fastener may be produced very cost-effectively.

The suspension arm is advantageously free of sharp, externally active sharp-edged fracture surfaces in particular if the material recess in the suspension arm is made, particularly by a casting core, particularly as bag-shaped, in such a way that twisting or displacement of the suspension arm caused by an accident turns or pushes the fastener, in particular the screw, at least partially into the material recess while breaking through the wall of the hole.

The failure of the intended breakpoint may be advantageously implemented easily in that the particularly bag-shaped material recess is mechanically machined into the suspension arm in the direction toward the hole, in particular by removing material. The dimension of the wall of the hole, in the direction toward the material recess, is most simply determined by the material-removing machining of the material recess in the suspension arm.

If the suspension arm is a wheel suspension for a rear wheel, in the event of a rear impact, the advantages of the present invention are especially effective if the material recess runs essentially in the horizontal direction, having its opening oriented toward the vehicle exterior associated with the suspension arm, parallel and oriented identically to the hole, in particular situated behind the hole viewed in the travel direction.

Other objects, advantages and novel features of the present invention will become apparent from the following detailed description of the invention when considered in conjunction with the accompanying drawings.

BRIEF DESCRIPTION OF THE DRAWING

A preferred exemplary embodiment of the present invention is explained in greater detail in the following description and the associated drawings.

DETAILED DESCRIPTION OF THE DRAWING

Figure 1:
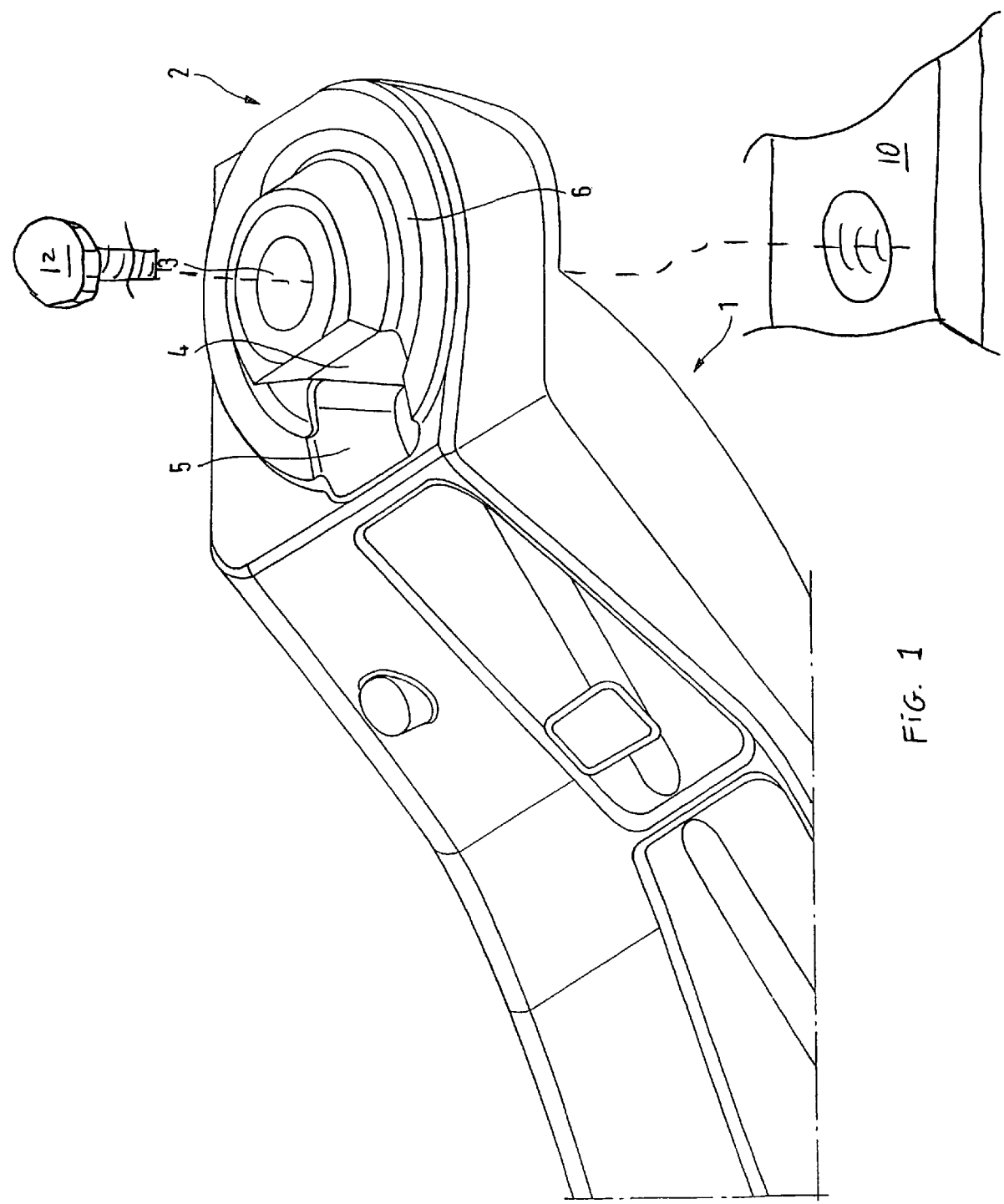
FIG. 1 shows a spatial partial illustration of a suspension arm having an intended breakpoint according to the present invention.
Figure 2:
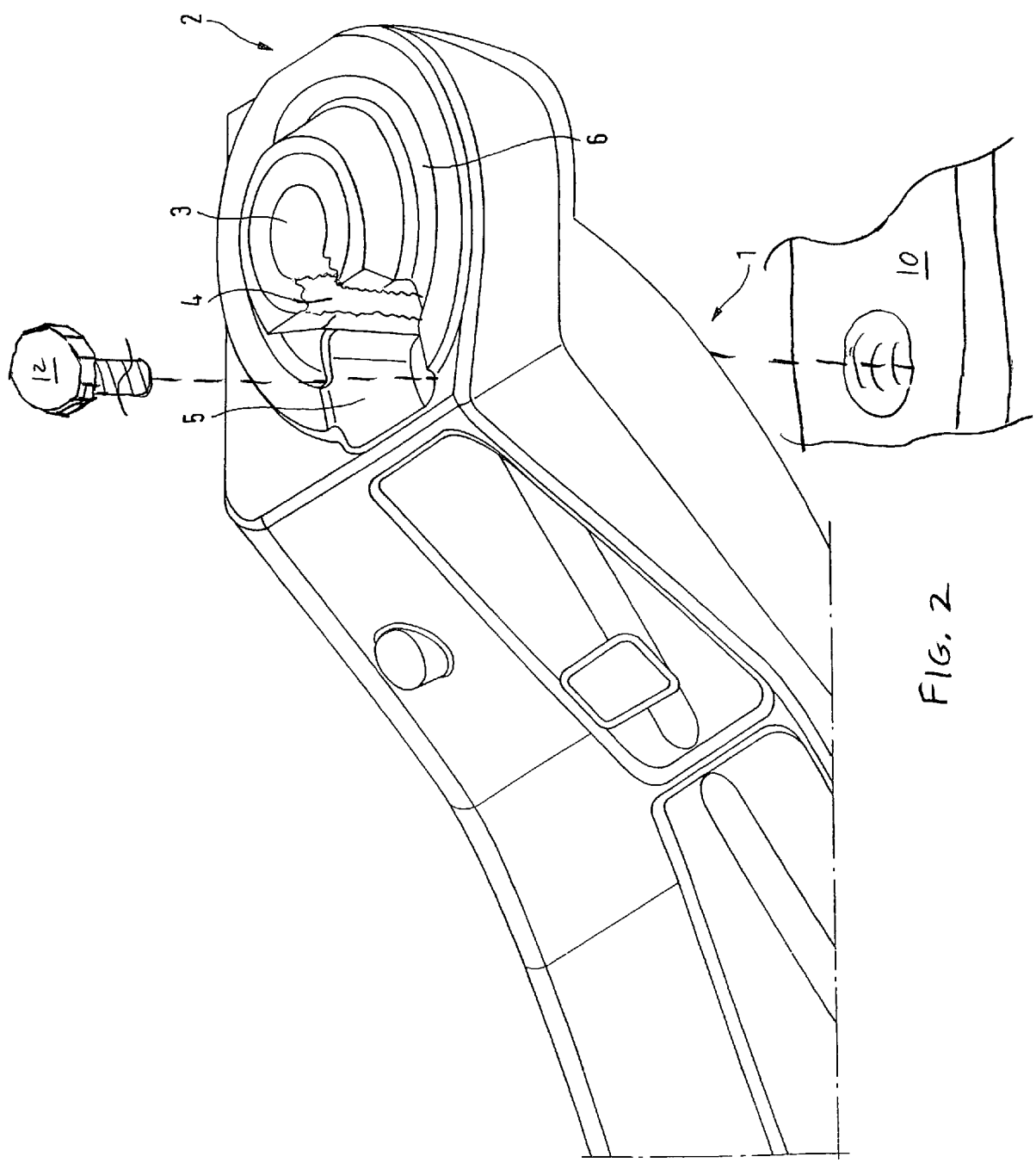
FIG. 2 shows the suspension arm of FIG. 1, with the fastener broken out of the hole.

An exemplary longitudinal suspension arm 1, according to an embodiment of the invention, may be produced from cast light alloy, for use in a vehicle wheel suspension, which is provided on a first end (not shown) with a stub axle for receiving a vehicle wheel and on a second end 2 with a pocket threaded hole 3 for receiving a screw 12 for fastening a bearing (not shown) to connect the longitudinal suspension arm 1 to a subframe 10 The exemplary arm has a portion intended as a breakpoint 4 designed to fail because of strain overload by deformation of the vehicle during an accident. In case of failure, the screw breaks at least partially out of the pocket threaded hole 3 essentially in the radial direction, because the wall 6 of the pocket threaded hole 3 is weakened in at least one radial direction outward from the pocket threaded hole center point by at least one material recess 5 as shown in FIG. 2. For this purpose, the exemplary material recess 5 according to this embodiment is mechanically machined into the longitudinal suspension arm 1 by removing material in the direction toward the pocket threaded hole 3, to determine the dimension of the wall 6 at the intended breakpoint 4 and thus its strength.

The exemplary material recess 5 may be made bag-shaped by a casting core in the longitudinal suspension arm 1 in such a way that twisting or displacement of the longitudinal suspension arm 1 caused by an accident turns or shifts the screw at least partially into the material recess 5 while breaking through the wall 6 of the pocket threaded hole 3 at the intended breakpoint 4. For example, the material recess 5 is formed along a longitudinal axis of the longitudinal suspension arm 1.

As shown, the material recess 5 for the case of failure of a longitudinal suspension arm 1 for a rear wheel, for a rear impact, especially favorably runs in the horizontal direction, having its opening directed toward the vehicle exterior side associated with the longitudinal suspension arm 1, parallel and oriented identically to the pocket threaded hole 3, in particular situated behind it viewed in the travel direction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A suspension arm for a vehicle wheel suspension, comprising:
   a first end with a stub axle for receiving a vehicle wheel;
   at least one second end with a hole for receiving a fastener for fastening a bearing to connect the suspension arm to a subframe of a vehicle body; and
   an intended breakpoint of the suspension arm adapted to fail because of strain overload resulting from deformation of the vehicle relative to the second end during an accident, the intended breakpoint allowing the fastener to break through a wall of the hole, thus breaking out of the hole.

2. The suspension arm for a vehicle wheel suspension according to claim 1, further comprising elements produced by a casting method.

3. The suspension arm for a vehicle wheel suspension according to claim 1, wherein the fastener comprises one of a bolt and a screw.

4. The suspension arm for a vehicle wheel suspension according to claim 1, wherein the fastener at least partially breaks out of the hole in a substantially radial direction of the hole.

5. The suspension arm for a vehicle wheel suspension according to claim 1, wherein a wall of the hole is weakened in at least one radial direction outward from a hole center point.

6. The suspension arm for a vehicle wheel suspension according to claim 1, wherein a wall of the hole is weakened by at least one material recess.

7. The suspension arm for vehicle wheel suspension according to claim 6, wherein the material recess has an opening and is parallel and identically oriented to the hole.

8. The suspension arm for a vehicle wheel suspension according to claim 7, wherein the opening is situated adjacent the hole.

9. The suspension arm for a vehicle wheel suspension according to claim 1, wherein the hole comprises a pocket threaded hole and the fastener comprises a screw which is screwable into the pocket threaded hole.

10. The suspension arm for a vehicle wheel suspension according to claim 9, wherein the material recess is obtained by using a casting core in the suspension arm, wherein pivoting or displacement of the suspension arm caused by an accident turns or pushes the fastener at least partially into the material recess while breaking through the breakpoint of a weakened wall of the hole.

11. The suspension arm for a vehicle wheel suspension according to claim 8, wherein the particularly bag-shaped material recess is mechanically machined into the suspension arm in a direction toward the hole.

12. The suspension arm for a vehicle wheel suspension according to claim 11, wherein a dimension of the wall of the hole in the direction toward the material recess is determined by the material-removing machining of the material recess.

13. The suspension arm for a vehicle wheel suspension according to claim 11, wherein the hole is formed by removing material.

14. A vehicle suspension, comprising:
    a suspension arm for attaching a wheel to a vehicle subframe,
    a stub axle disposed at one end of the suspension arm, for connecting to the wheel;
    a wall portion of the suspension arm defining a hole at another end, the hole being adapted for receiving a fastener to the vehicle subframe; and
    a breakpoint of the wall portion for causing failure of the wall portion under strain overload due to an accident, and allowing the fastener to break through the wall portion defining the hole.

15. The vehicle suspension according to claim 14, wherein the breakpoint of the wall portion, after failure, allows the fastener to break out of the hole into a material recess.

16. The vehicle suspension according to claim 15, wherein the breakpoint allows the fastener to break out along a substantially radial direction of the hole.

17. The vehicle suspension according to claim 14, wherein the breakpoint comprises a material recess disposed radially outward from the hole.

18. The vehicle suspension according to claim 17, wherein the material recess is mechanically machined to remove material.

19. The vehicle suspension according to claim 14, wherein the breakpoint comprises a material recess disposed from the hole along a longitudinal axis of the suspension arm, towards the first end.

20. The vehicle suspension according to claim 14, wherein the fastener comprises one of a bolt and a screw.

* * * * *